United States Patent [19]

Wheless et al.

[11] Patent Number: 4,571,917
[45] Date of Patent: Feb. 25, 1986

[54] APPARATUS FOR PACKING OVAL CIGARETTES

[75] Inventors: Jack C. Wheless; Richie H. Dickerson, both of Richmond, Va.

[73] Assignee: Philip Morris Incorporated, New York, N.Y.

[21] Appl. No.: 677,254

[22] Filed: Dec. 3, 1984

Related U.S. Application Data

[63] Continuation of Ser. No. 532,661, Sep. 13, 1983, abandoned, which is a continuation-in-part of Ser. No. 496,352, May 19, 1983, abandoned.

[51] Int. Cl.⁴ .............................................. B65B 19/04
[52] U.S. Cl. ........................................ 53/148; 53/151; 131/283; 221/251
[58] Field of Search ................. 53/148, 149, 150, 151, 53/152, 236, 439, 444, 446, 475, 530; 198/419, 420, 493; 221/278, 251, 224, 225; 131/283

[56] References Cited

U.S. PATENT DOCUMENTS

| 1,587,418 | 6/1926 | Reyes | 53/150 |
| 1,668,693 | 5/1928 | Molins | 53/151 |
| 1,927,648 | 9/1933 | Neff | 53/150 |
| 1,993,619 | 3/1935 | Neff et al. | 53/150 |
| 2,320,650 | 6/1943 | Popov | 53/150 |
| 3,587,924 | 6/1971 | DiOrio | 221/251 |
| 3,891,014 | 6/1975 | Gunn | 221/251 |
| 4,306,648 | 12/1981 | Manservisi et al. | 53/149 |
| 4,364,464 | 12/1982 | Manservisi et al. | 53/150 |

FOREIGN PATENT DOCUMENTS 453066 12/1927 Fed. Rep. of Germany ........ 53/151

Primary Examiner—John Sipos
Assistant Examiner—Donald R. Studebaker
Attorney, Agent, or Firm—Jeffrey H. Ingerman

[57] ABSTRACT

Apparatus is disclosed for packing oval-shaped articles such as cigarettes to achieve a predetermined orientation of the articles in a container.

4 Claims, 36 Drawing Figures

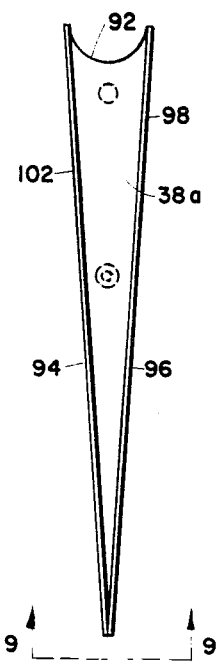
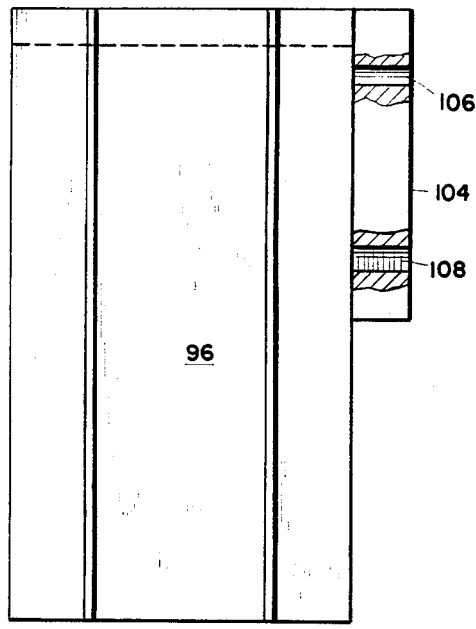
Fig. 7   Fig. 8
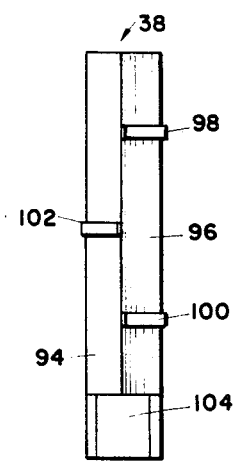
Fig. 9

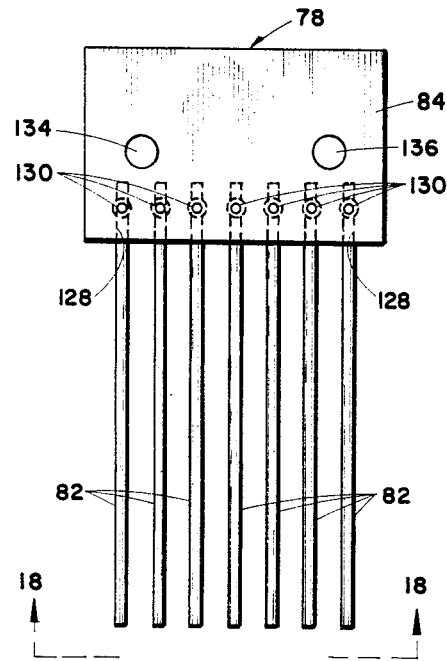
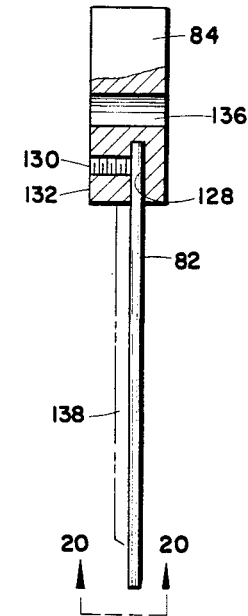
Fig. 17  Fig. 19
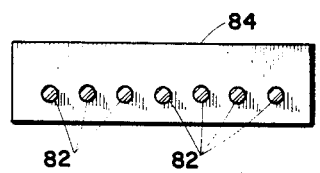
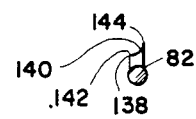
Fig. 18  Fig. 20

APPARATUS FOR PACKING OVAL CIGARETTES

CROSS-REFERENCE TO RELATED APPLICATIONS

This application is a continuation of copending U.S. patent application Ser. No. 532,661, filed Sept. 13, 1983, now abandoned, which is a continuation-in-part of copending U.S. patent application Ser. No. 496,352, filed May 19, 1983, now abandoned.

BACKGROUND OF THE INVENTION

The present invention pertains generally to packing cigarettes and other rod-shaped smoking articles, and pertains more especially to packing cigarettes and other smoking articles of oval cross-section. The invention will be described throughout with reference to oval cigarettes only, but it is to be understood that the scope of the invention includes methods and apparatus of the type claimed for packing any rod-shaped smoking articles.

Conventional cigarette packs are designed to receive a specified number of cigarettes (typically twenty) of circular cross-section, and can receive that number of cigarettes only in certain configurations. To pack such cigarettes, it is only necessary to position the correct number of cigarettes in the correct position relative to each other and to move them longitudinally (axially) into the pack.

Oval cigarettes, however, present an additional problem. The volume that will be occupied by a given number of such cigarettes depends not only upon their relative position but also upon the angular position of each cigarette about its longitudinal axis (hereinafter, its "angular orientation"). If all the oval cigarettes that are to be put in one row have the same angular orientation, the row will occupy far less volume than otherwise.

It would therefore be desirable to provide a method and apparatus capable of orienting oval cigarettes in a particular manner and placing them in a pack or box of a chosen size and shape. It is the object of the invention to provide such a method and such an apparatus.

SUMMARY OF THE INVENTION

The apparatus of the invention comprises means for dividing or separating a supply of oval smoking articles into a plurality of groups following parallel pathways, means for receiving the articles in a first predetermined angular orientation relative to the apparatus, and pusher means for moving the articles, with a predetermined angular orientation (the "packing orientation") which may or may not be the same as the first orientation, into a container located at a predetermined packing position.

Preferably, the receiving means includes a receiving bed shaped to receive the articles only in the first predetermined angular orientation. The bed preferably has troughs shaped to receive the articles as desired, and vacuum suction to help pull the articles into the troughs and to hold them there. In one embodiment, the first orientation and the packing orientation are the same, and the articles are ready to be packed as soon as they are received on the bed. In a second, the articles are received on the bed in the packing orientation but spaced too far apart for packing. The bed is retracted in such a manner as to cause, the articles to fall onto a lower bed with slightly closer together troughs. After falling into the lower troughs, the articles are ready to be packed. In a third embodiment, the bed receives the articles correctly oriented but spaced too far apart for packing, and corrects the spacing by moving the troughs of the bed together.

According to another embodiment, the cigarettes fall along pathways with the major axis of the cigarette cross-section substantially horizontal ("hereinafter horizontal orientation") and are received in that orientation on the receiving bed. A retainer mechanism is provided to apply pressure, preferably axially, to a layer of cigarettes above those lying on the receiving bed. The pressure holds the cigarettes to which it is applied stationary against a stationary element. This permits the bottom layer of cigarettes to be pushed into a container at the packing position without hindrance from the weight of the overlying layers of cigarettes. After the bottom layer has been loaded, the retaining pressure is released, allowing the cigarettes to fall one layer. The retaining pressure is then reapplied to allow the new bottom layer to be loaded.

The retaining device preferably includes a set of fingers mounted to be pivotable into and out of contact with one layer of cigarettes in the pathways. The fingers are spring-biased to urge the cigarettes against a stationary element and may, but need not, be roughened (or otherwise be provided with a special surface) to improve their grip on the cigarettes. Instead of separate fingers, a single plate could be used. A cam system is preferably used to control the timing of the application and the release of pressure.

The retaining device can be used with a receiving bed that orients the cigarettes by means of the shape of the bed, or with rotatable pusher rods that grip the ends of the cigarettes, e.g., by suction, and orient them by rotation.

It is to be understood that "oval", as used herein, is not limited to elliptical articles, but includes any non-circular shape, even one with one or more flat portions or edges. Similarly, the use of the terms "major axis" and "minor axis" are not to be understood as limiting the invention to packing articles with elliptical cross-sections.

Many other objects and features of the invention will become clear from a consideration of the following detailed description of several preferred embodiments, taken together with the accompanying figures, in which like reference characters refer to like elements throughout.

BRIEF DESCRIPTION OF THE FIGURES

FIG. 7 is a frontal view of one vane of the embodiment of FIG. 3.

FIG. 8 is a side view of one vane of the embodiment of FIG. 3.

FIG. 9 is a view from below of one vane of the embodiment of FIG. 3.

FIG. 17 is a top view of the pusher assembly of the embodiment of FIG. 3.

FIG. 18 is a back view, taken from line 18—18 of FIG. 17.

FIG. 19 is a side view of the pusher assembly of FIG. 17.

FIG. 20 is an end view, taken from line 20—20 of FIG. 19.

DETAILED DESCRIPTION OF THE PREFERRED EMBODIMENTS

Figure 1:
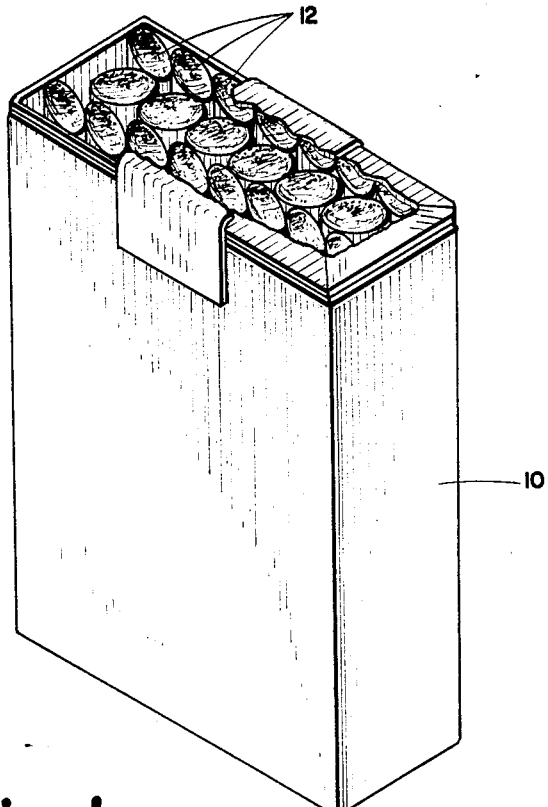
FIG. 1 is a perspective view of a soft pack containing twenty cigarettes of oval cross-section packed in one preferred configuration.

FIG. 1 shows a soft pack 10 containing twenty cigarettes 12 of oval cross-section. The cigarettes 12 are arranged in three rows in the pack. The front and back rows have seven cigarettes each, and the intermediate row has six cigarettes. The cigarettes in the front and back rows are all angularly oriented so that the major axes of the oval cross-sections of the cigarettes are parallel. The six cigarettes in the intervening row are arranged with a different angular orientation, so that the major axes of their cross-sections, while parallel to each other, are inclined at an oblique angle to those of the other rows of cigarettes. The arrangement illustrated in FIG. 1 is particularly preferred because of its aesthetic appeal.

Figure 2:
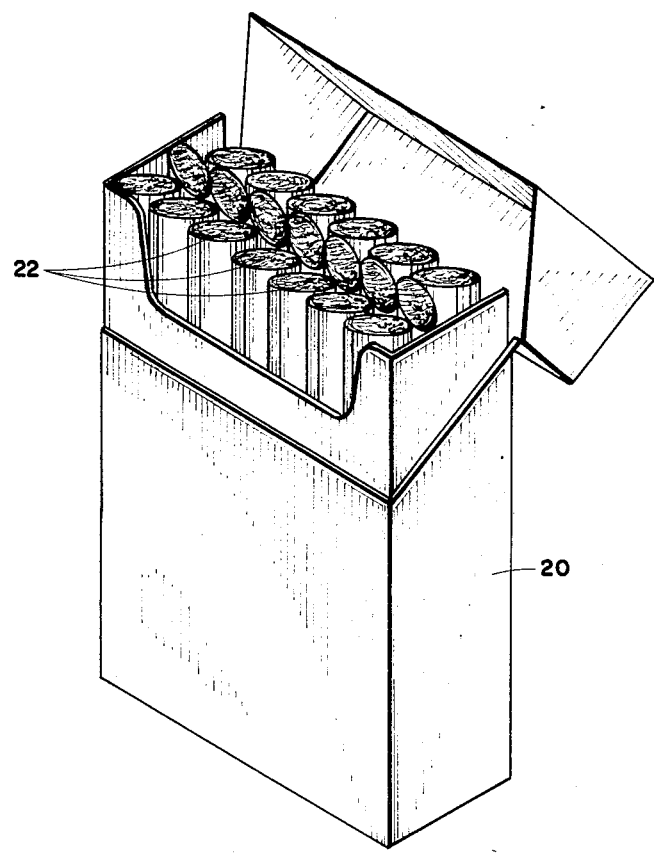
FIG. 2 is a view similar to that of FIG. 1 showing a flip-top box containing twenty oval cigarettes arranged in a second preferred configuration.

FIG. 2 is a perspective view of a similar arrangement in a flip-top box 20, in which the front and middle rows each have seven cigarettes 22, the back row having only six. Again, the cigarettes of the front and back rows are oriented parallel to each other, while the seven cigarettes of the middle row are oriented at a different angle. This arrangement is also preferred for its aesthetic appeal. Flip-top boxes can also be packed with the seven-six-seven arrangement shown in FIG. 1, provided that adequate clearance is left so as not to cause the box lid to bind.

Many other arrangements besides the two illustrated are possible. These two arrangements, however, will suffice to indicate the nature of the problem solved by the present invention, viz., to pack oval smoking articles with a predetermined angular orientation of the oval cross-section.

Figure 3:
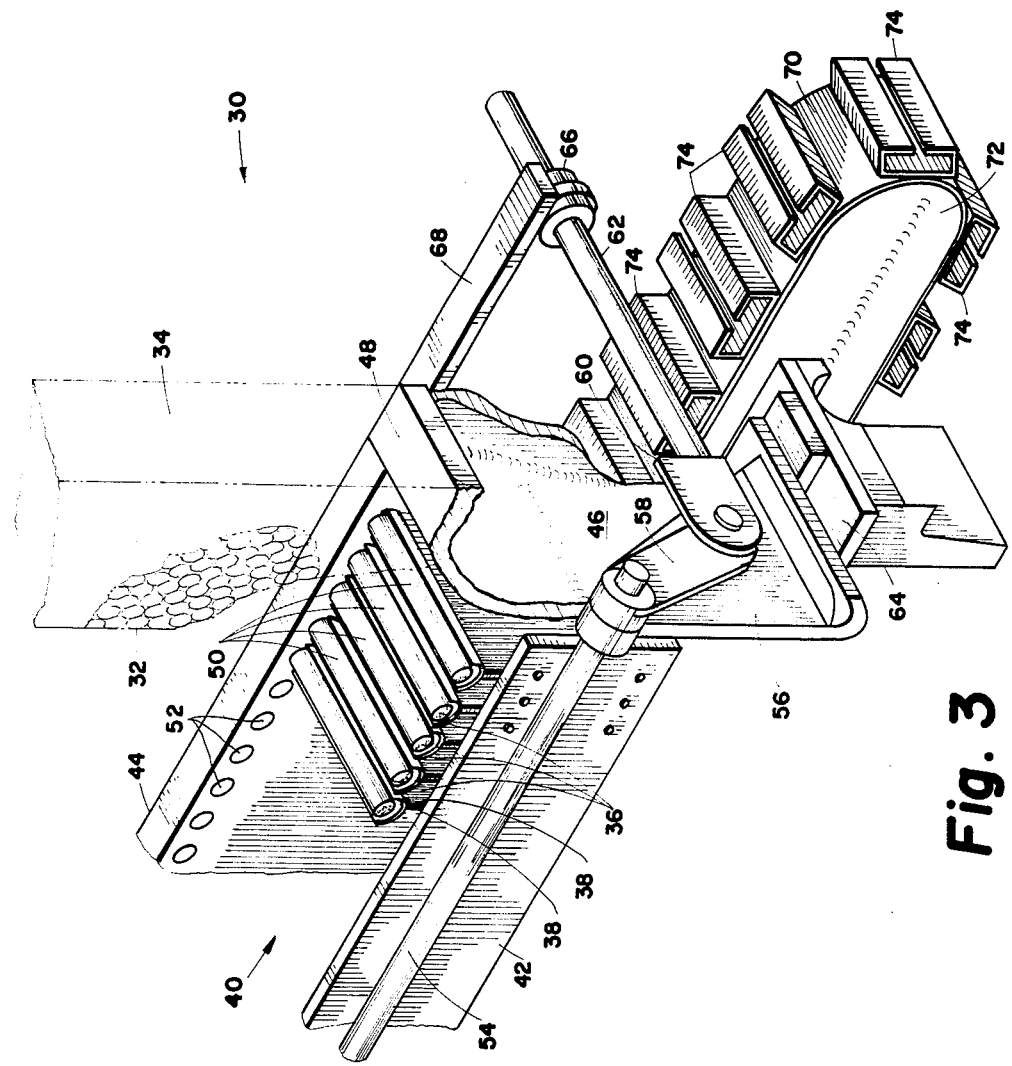
FIG. 3 is a schematic view in perspective of a portion of one preferred embodiment of the invention.
Figure 5:
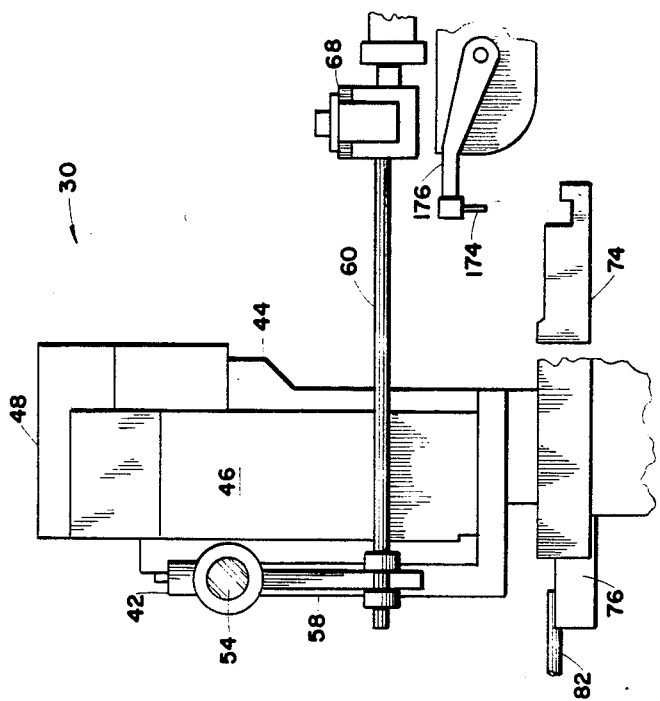
FIG. 5 is a side view of the embodiment of FIG. 3.

FIG. 3 is a schematic perspective view of one preferred embodiment of the invention, illustrating the layout of the packing machine 30. As shown, oval cigarettes 32 are supplied to the machine of the invention in a vertical hopper or tray 34 (indicated in phantom) or other container such that the cigarettes have their longitudinal axes aligned with each other but are otherwise oriented at random.

The cigarettes fall from the tray 34 along several generally vertical paths 36 defined by vanes 38 which are part of a hopper 40 located between front and back plates 42, 44. (For clarity, only five vanes 38 are shown in FIG. 3, but a larger number would be provided in practice.) In the preferred embodiment shown, the vanes 38 are secured to the back plate 44. For a twenty cigarette pack, it is most convenient to provide vanes 38 defining twenty paths and receiving beds with a combined capacity of twenty cigarettes. The twenty paths are divided into three groups, two of seven paths and one of six paths, corresponding to the three rows to be provided in the pack. Each group comprises a separate hopper defined by vanes 38. The vanes are V-shaped as seen from the front, and those of each hopper converge sufficiently that the pathways defined thereby are of uniform width.

The volume containing the three hoppers 40 is bounded on each end by a side plate 46 (only one of which is shown). In the embodiment shown, the side plates are continuous and integral with the back plate 44 and have upper flanges 48 on which the tray 34 rests.

Rotatable knurled agitator rods 50 supported from behind the back plate 44 extend through holes 52 in the back plate 44 and lie immediately above respective vanes 38. The agitator rods 50 are rotated, all in the same direction, by conventional drive means (not shown) and help guide the cigarettes 32 into the pathways 36 defined by the vanes 38, as described below.

Behind and below the back plate 44 is a horizontal endless belt 70 mounted on two drums 72 (only one of which is shown) and driven by conventional means (not shown). The belt 70 bears a plurality of boxes or pockets 74 made of polyethylene or the like, having approximately the shape of a cigarette pack. The pockets 74 are loaded with cigarettes one row at a time, and the complete group of properly positioned and oriented cigarettes is subsequently transferred in known manner to a pack or box.

The cigarettes 32, after falling along the paths 36 defined by the vanes 38, are received on a tray-like receiving bed 76 in a predetermined orientation which, in the embodiment shown in FIG. 3, is the orientation the cigarettes are to have when packed. A pusher device 78 (not shown in FIG. 3; see FIGS. 4, 5 and 17-20) is provided below the front plate 42 and pushes the properly oriented cigarettes 32 from the receiving bed 76 directly back into a pocket 74. To pack three rows of cigarettes in each pocket 74, as would be necessary to obtain the arrangements shown in FIGS. 1 and 2, the pocket 74 will stop at three locations behind the back plate 44. Three receiving beds are provided beneath the vanes 38, one for each row of cigarettes. The first bed, for packing the bottom row, is lower than the second by the height of one row of cigarettes (in the packing orientation), and the second bed is lower than the third by the same amount. Each pocket 74 stops briefly behind each of the three beds and is loaded with one row of cigarettes at each.

As can be seen in FIGS. 4 and 11-16, the receiving bed 76 of the first preferred embodiment is a tray-like element whose upper surface is provided with troughs 80 equal in number to the cigarettes to be packed in the row in question (seven in these Figures). The troughs 80 are shaped so that an oval cigarette will fit snugly therein only in the correct orientation for packing. For example, the troughs 80 may be shaped to accommodate one end of the major axis of the cigarette cross-section fairly snugly. In the version shown, the packing orientation is with the major axis of the oval cross-section about twenty degrees from the horizontal.

The pusher mechanism 78 (see FIGS. 5 and 17-20) includes a plurality of pusher rods 82, one for each trough 80, secured to a block 84. Movement of the pusher element 78 slides cigarettes on the receiving bed 76 back along the troughs 80 and into a pocket 74 positioned to receive the cigarettes.

A cover 86 is located on the back of the receiving bed 76. The lower surface of the cover 86 has troughs 88 which, together with those of the bed 76, define tubes 90 of approximately the same size and shape as the cigarette cross-section. The tubes 90 serve as guides to insure the smooth movement of the cigarettes from the bed 76 into the pocket 74.

The design of the vanes 38 is shown in detail in FIGS. 7-9. Each vane 38 as seen from the front (FIG. 7) is essentially a "V" in shape, with a concave upper surface 92. The lateral surfaces 94, 96 of the vane 38 are provided with vertical ribs 98, 100, 102, two on one side (FIG. 8), and one on the other disposed approximately half-way between those on the first side. The ribs space the cigarettes from the vane surface, reducing friction.

A block 104 equal in height to about one-half the height of the vane 38 extends back from the top of the rear of the vane 38, and is received in a slot or recess (not shown) provided for it in the back plate 44. (If desired, the vanes 38 can be secured to the front plate 42 instead of or in addition to the back plate 44. In that case, the block extends from the front of the vane 38.) Two bores 106, 108 are provided in the block 104 to receive screws or bolts to secure the vane to the front or back plate, as the case may be.

Figures 6, 10:
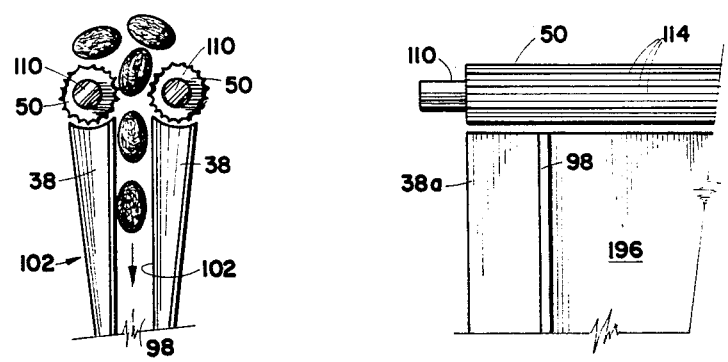
FIG. 6 is a a partial side view of the agitator rods and vanes of the embodiment of FIG. 3.
FIG. 10 is a view illustrating the operation of the rods and vanes.
Figure 11:
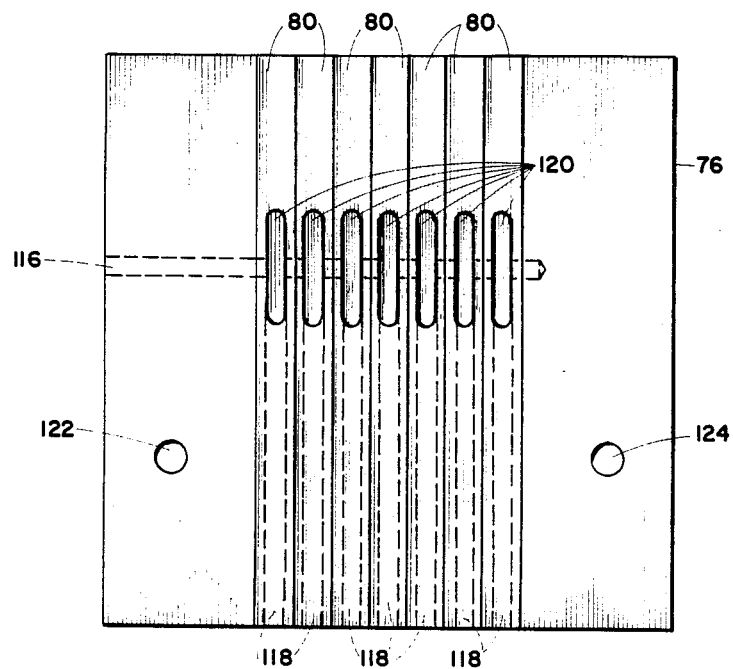
FIG. 11 is a top view of a tray-like receiving member employed in the embodiment of FIG. 3.
Figure 12:
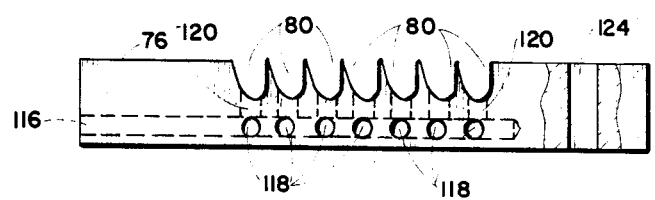
FIG. 12 is a frontal view of the receiving member of FIG. 11.
Figure 13:
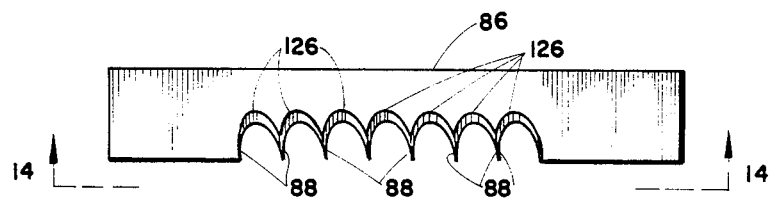
FIG. 13 is a frontal view of the cover of the receiving member of FIG. 11.
Figure 14:
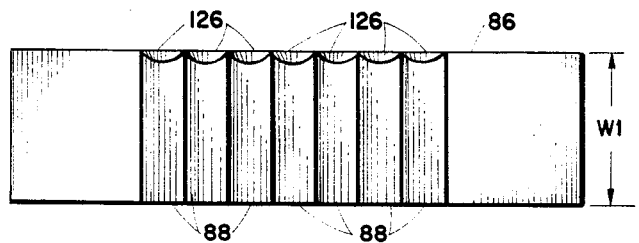
FIG. 14 is a bottom view of the cover of FIG. 13.

As can be seen from FIGS. 6 and 10, each of the agitator rollers 50 has a spindle 110 extending from each end. The back spindles extend through the holes 52 provided in the back plate 44 for them and are rotated by suitable drive means. The main body of the roller 50 has knurls 114 extending parallel to its axis. As indicated in FIG. 10, a cigarette entering the space between two of the rollers 50 with an oblique orientation engages one or both rollers 50, which direct the cigarette into the path between the vanes 38 with the greatest dimension of the cigarette cross-section substantially vertical (hereinafter, the "vertical orientation").

FIGS. 11-16 show the receiving bed 76 and the cover 86 of the embodiment of FIG. 3. As stated, the receiving bed 76 is a plate or tray-like element whose upper surface is formed with troughs 80 shaped as described above. In the version shown, the plate has seven such troughs 80. The other two receiving beds used to form packs of cigarettes according to this embodiment would have six and seven troughs, respectively. Preferably, vacuum suction is applied to cigarettes in the troughs 80 to help pull the cigarettes into the proper orientation. The suction is provided via a horizontal bore 116 in the plate 76, from which horizontal side bores 118 extend below and parallel to the troughs 80. An elongated well 120 in the bottom of each trough 80 communicates with the underlying horizontal side bore 118. Two additional holes 122, 124 are provided to receive bolts for securing the bed 76 in place.

The tray cover 86, as can be seen from FIGS. 13-16, has troughs 88 formed in its undersurface, equal in number to the troughs 80 of the receiving bed 76. The cover 86 rests on the back portion of the remaining bed 76, the troughs 88 cooperating with troughs 80 to define tubes 90. The width W1 of the cover 86, measured parallel to the troughs 88, is less than the corresponding dimension of the bed 76 by at least the approximate length of a cigarette (see FIG. 16). The front edge 126 of each trough 88 of the cover 86 is beveled slightly to facilitate the entry of a cigarette from the uncovered part of the receiving bed trough 80 into the tube 90.

Figure 15:
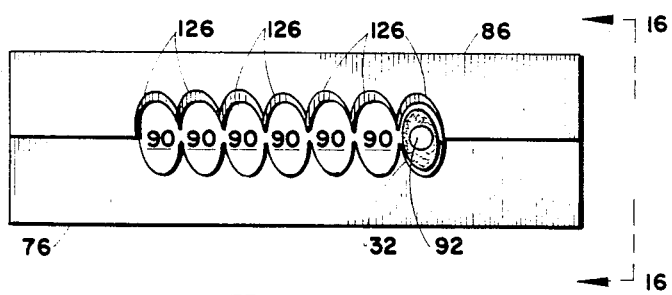
FIG. 15 is a frontal view of the receiving member and cover in their operating position.
Figure 16:
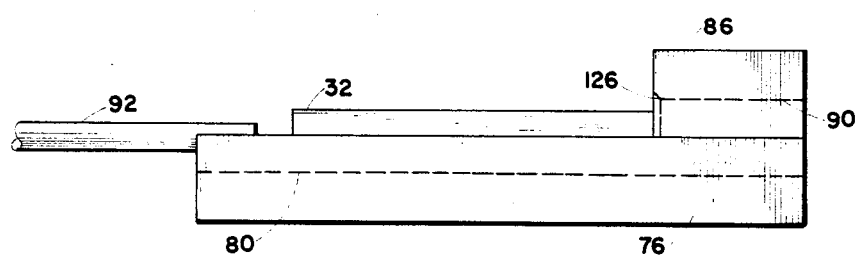
FIG. 16 is a side view, taken from line 16—16 in FIG. 15.

The pusher element 78 of the preferred embodiment 30 of FIG. 3, shown in FIGS. 17-20, includes a block or plate 84 having in one edge several apertures 128 equal in number to the troughs 80 of the receiving bed 76. A pusher rod 82 is secured in each aperture 128 by means of a screw 130 received in a bore 132 provided for that purpose in the upper surface of the pusher plate 84 and communicating with the corresponding horizontal aperture 128. When the pusher element 78 is in place in the machine 30, each of the pusher rods 82 lies in or just over a corresponding trough 80, as indicated in FIG. 15. The pusher element plate 84 has two holes 134, 136 to receive bolts to secure it to the machine.

Figure 4:
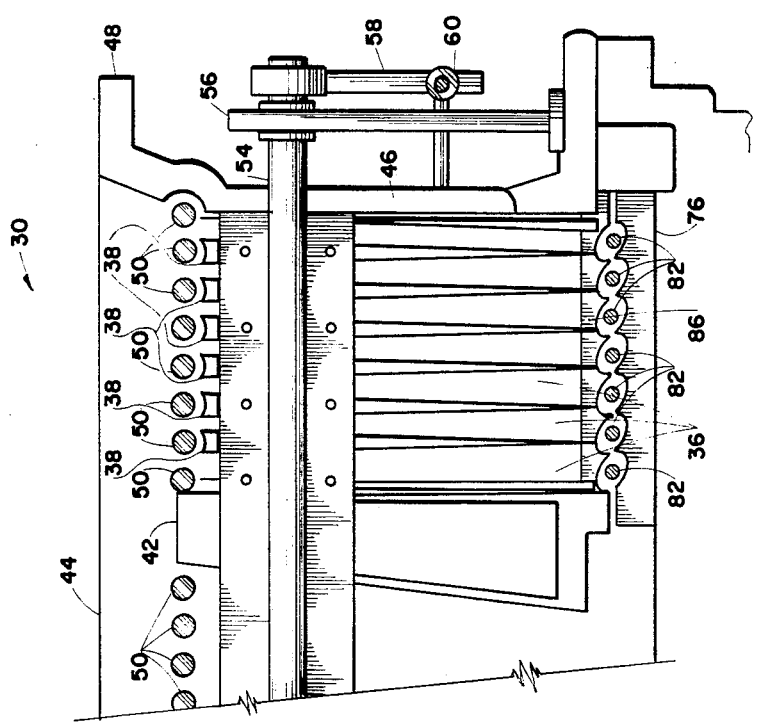
FIG. 4 is a frontal view, partly in section, of the embodiment of FIG. 3.

As will be apparent from FIG. 4, the lower portion of each vane 38 is disposed slightly above the ridge separating two adjacent troughs 80 of the receiving bed 76. As the cigarettes fall from the paths defined by the vanes 38, the first cigarette in each path will come to rest in the underlying trough 80, and the following cigarettes will fall upon the first, forming a column. In order to prevent the weight of the upper cigarettes from interfering with the easy movement of the bottom cigarette from the receiving bed 76 into the pocket 74, each of the pusher rods 82 is provided with a lifting element 138 on its upper surface, as indicated in FIG. 20. The lifting element 138 is a ridge having an asymmetrically curved upper surface 140 which extends from a low point 142 on one side to a peak 144 on the other side. As can be seen from FIG. 19, the free end of each pusher rod 82 is circular in cross-section, the lifting element 138 beginning a short distance away from the point of the rod 82. The end of each lifting element 138 is oblique, to prevent damage to the cigarettes it lifts. As an alternative to the lifting elements 138, a second plate (not shown) could be secured to the pusher element plate 84 to serve the same function for all the pusher rods 82.

Figure 21:
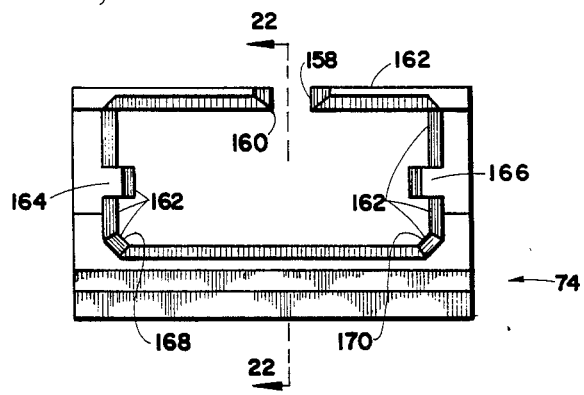
FIG. 21 is an end view of the cigarette-pack-shaped pocket, into which the cigarettes are loaded in the correct configuration, of the embodiment of FIG. 3.
Figure 22:
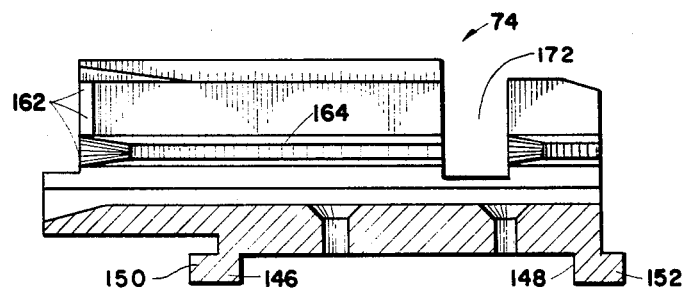
FIG. 22 is a cross-sectional view, taken from line 22—22 of FIG. 21.

FIGS. 21 and 22 show the preferred embodiment of the pocket 74 to be used in the present invention. As can be seen, the pocket 74, which is preferably of polyethylene or a similar material, is oblong and defines an approximately oblong internal volume. The lower surface of the pocket 74 has front and back depending flanges 146, 148 each of which has a horizontal rim 150, 152 on it. The flanges 146, 148 grip the belt 70 between them, to aid in correctly positioning the pocket 74 thereon. Two through-holes 154, 156 in the bottom of the pocket 74 receive screws (not shown) to secure the pocket 74 to the belt 70. This arrangement facilitates insertion of a pusher rod into the pocket 74 to move cigarettes from the pocket 74 into a receptor cavity disposed on a loading conveyor wheel. The upper surface of the pocket 74 has a front-to-back slit 158 (see FIG. 21). The forward edges 160 of the slit and the forward edge 162 of the top surface of the pocket 74 are beveled to prevent any damage to cigarettes that may collide therewith while entering the pocket 74.

A slot 172 is provided toward the back of the pocket to receive the hold-down bar 174 borne on an arm 176 (see FIG. 5) for vertical motion for a purpose and in a manner that are well known to those skilled in the art.

The pocket 74 shown is to be used to pack cigarettes in the seven-six-seven configuration illustrated in FIG. 1. Accordingly, since the middle layer will have only six cigarettes (compared to the seven of the front and back rows), the front portion of the pocket 74 has left and right lateral internal projections 164, 166 extending along the full length of the pocket 74 and occupying space that in the actual pack of cigarettes will be empty. (To pack cigarettes in the formation of FIG. 2, the projections 164, 166 would be located against the upper internal wall of the pocket 174.) Projections 164, 166 are each divided in two separate sections by slot 172 (see FIG. 22). The forward edges of both the forward and the rear sections of projections 164, 166 are beveled as shown.

To aid in the loading of the oval cigarettes into the pocket 74, the lower internal corners 168, 170 at both sides of the pocket 74 are beveled as shown.

The operation of the embodiment of FIGS. 3-20 will now be described. A tray 34 containing finished oval cigarettes 32 is placed on top of the packer 30, resting on the horizontal flanges 48 of the side walls 46. The cigarettes 32 fall from the bottom of the tray 34 and strike the rotatable agitator rods 50. As already described, the agitator rods 50 guide the cigarettes 32 into the pathways 36 defined between each two adjacent vanes 38, and in doing so cause the cigarettes to assume a substantially vertical orientation. The cigarettes 32 ideally fall freely down each pathway 36, being held away from the vane surface by the ribs 98, 100, 102 on the vanes.

The suction applied to the receiving bed troughs 80 pulls the cigarettes firmly into the troughs 80, the shape of which forces the cigarettes 32 to assume the desired packing orientation. The cigarettes 32 are held in this orientation by the vacuum suction.

When the packing machine has, in the known manner, stopped a pocket 74 behind the packing bed 76 as shown, the pusher element 78 is moved toward the back of the machine 30, engaging the cigarettes 32 in the troughs 80 and pushing them through the tubes 90 defined by the receiving bed 76 and the cover 86, and into the pocket 74. As already described, the lifting element 138 on top of each of the pusher rods 82 engages and raises the cigarette lying upon that in the trough 80, ensuring smooth loading of the bottom layer without damaging the overlying cigarettes.

After retraction of the pusher element 78 to its starting position, allowing the next layer of cigarettes to fall onto the receiving bed 76, the machine 30 moves the pocket 74 to the next packing station, where the receiving bed is one cigarette layer thickness higher than that of the first station. At the second station, the second layer of cigarettes is packed into the pocket 74 in the same manner, after which the third and final layer is packed in the same manner at a third station.

Figure 23:
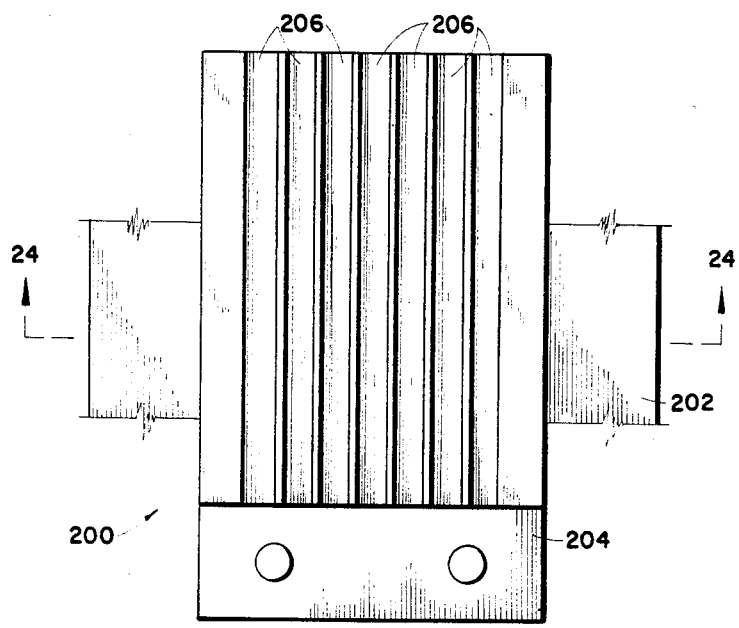
FIG. 23 is a top view of the receiving member of a second preferred embodiment of the invention.
Figure 24:
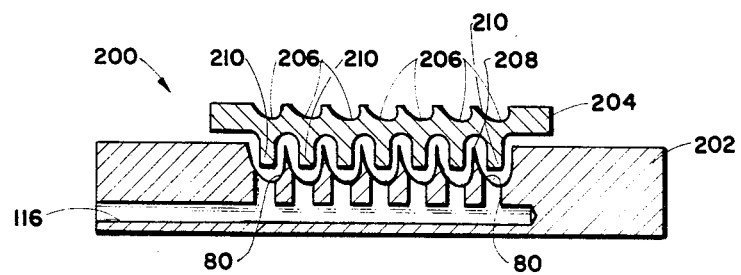
FIG. 24 is a cross-sectional view, taken from line 24—24 of FIG. 23.

FIGS. 23 and 24 show the receiving bed 200 according to another embodiment. In the second embodiment, a two-part receiving bed is used, of which the lower part 202 is substantially identical to the receiving bed 76 of the embodiment of FIGS. 3-22, as indicated by the reference numerals denoting the features of element 202. The upper receiving bed 204 is a plate or tray having troughs 206, 208 in both its upper and its lower surfaces. The troughs 206 in the upper surface are equal in number to those of the lower tray 202 and have substantially the same shape as the latter, but are spaced farther apart (the difference in spacing is not clearly shown in FIG. 24).

The upper tray 204 also has on its lower surface a set of ridges 210 which lie above and protrude into the troughs 80 of the lower tray 202. The ridges 210 separate troughs 208 which lie above the ridges dividing between the troughs 80 of the lower tray 202.

As shown in FIG. 24, the upper tray 204 is supported above and parallel to the lower tray 202, with the ridges 210 on the underside of the upper tray 204 extending partway into the troughs 80 of the lower tray 202. The upper tray 204 is connected to a suitable drive mechanism (not shown) in such a manner as to be reciprocable parallel to the trough axes.

In operation, the second embodiment directs the cigarettes into the pathways between the vanes in the same manner as the embodiment of FIG. 3. The cigarettes fall into the troughs 206 in the upper surface of the upper tray 202. Periodically, the upper tray 204 is moved away from the back plate 44, allowing the cigarettes to drop into the troughs 80 of the bottom tray 202. As stated above, the troughs 206 of the upper tray are spaced farther apart than those of the lower tray 202. The difference in spacing is small enough that each cigarette drops neatly from the upper tray 204 to the corresponding trough 80 in the lower tray 202, where it is retained by the shape of troughs 80 and with the aid of vacuum suction, with the proper orientation and spacing for packing.

Figure 25:
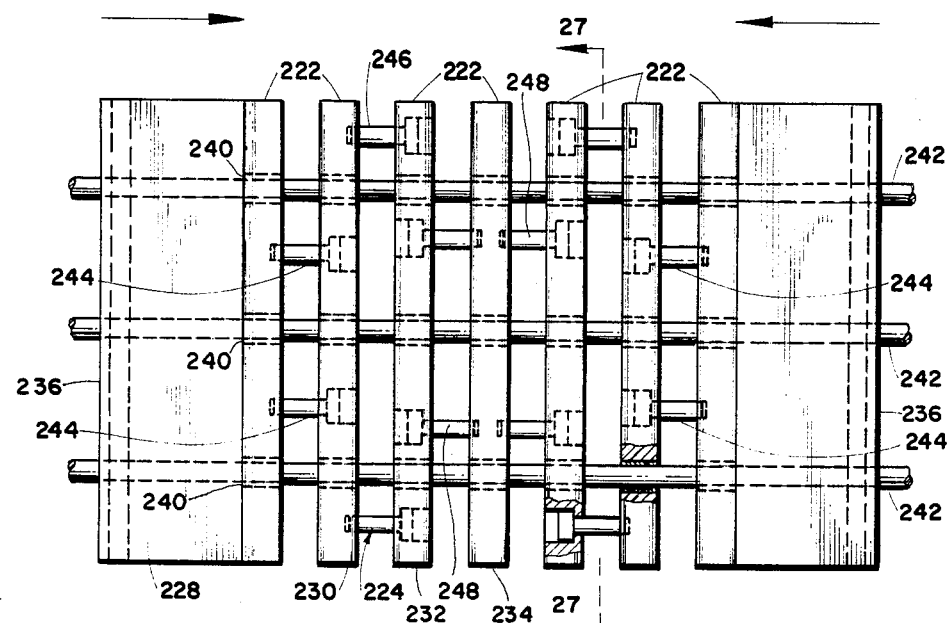
FIG. 25 is a top view of the receiving member of a third preferred embodiment of the invention.
Figure 26:
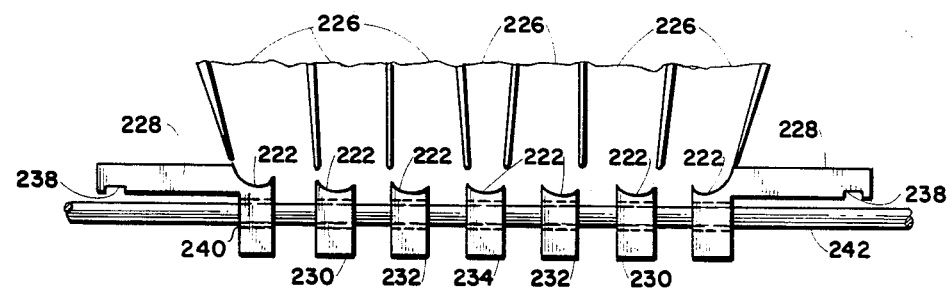
FIG. 26 is a front view of the element of FIG. 25.
Figure 27:
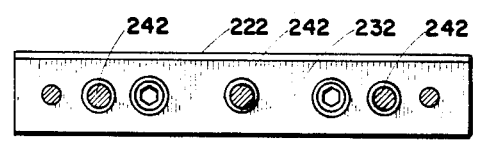
FIG. 27 is a detail of FIG. 26, taken from line 27—27 of FIG. 26.
Figure 28:
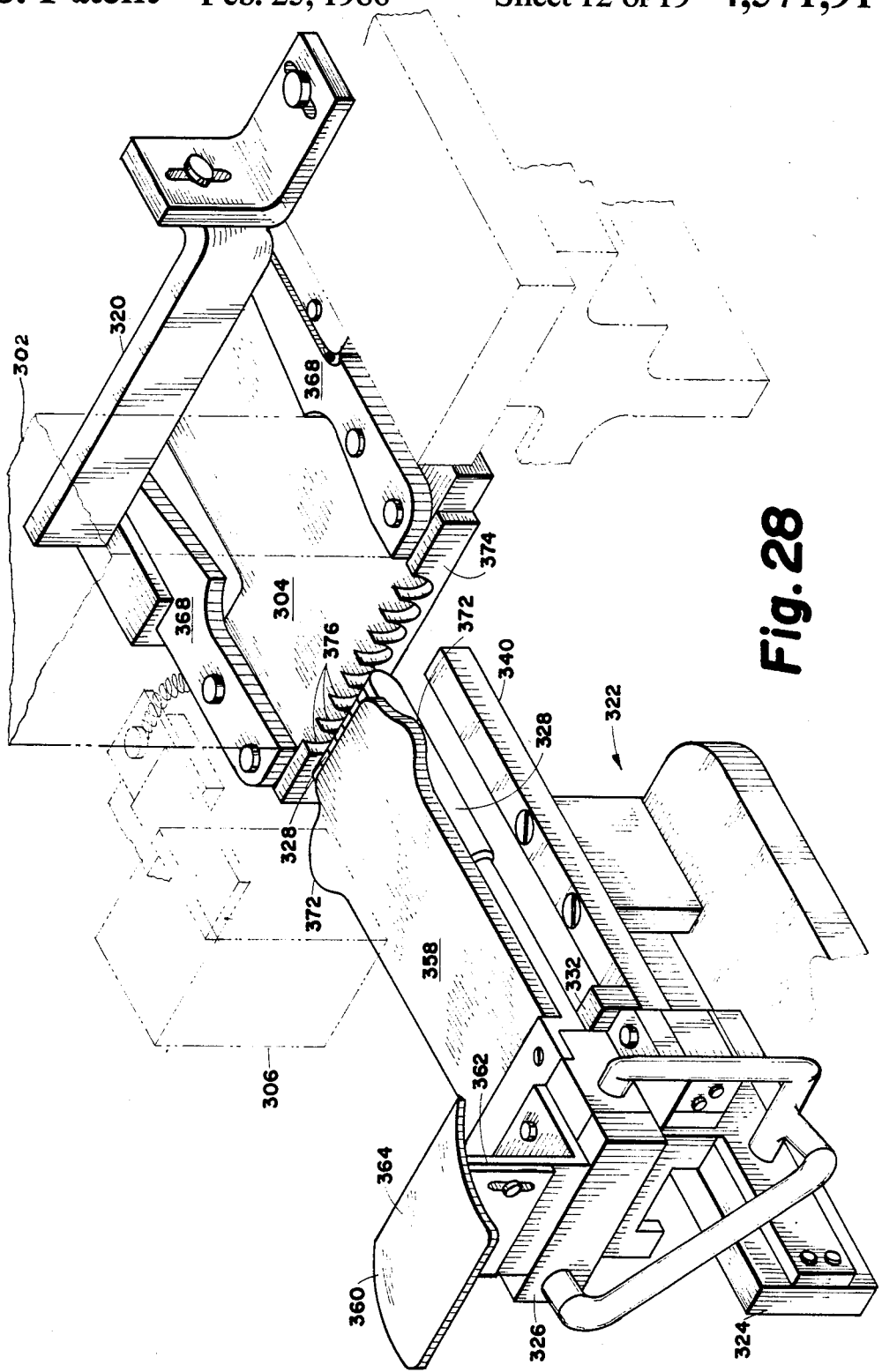
FIG. 28 is a perspective view of a portion of another preferred embodiment.
Figure 29:
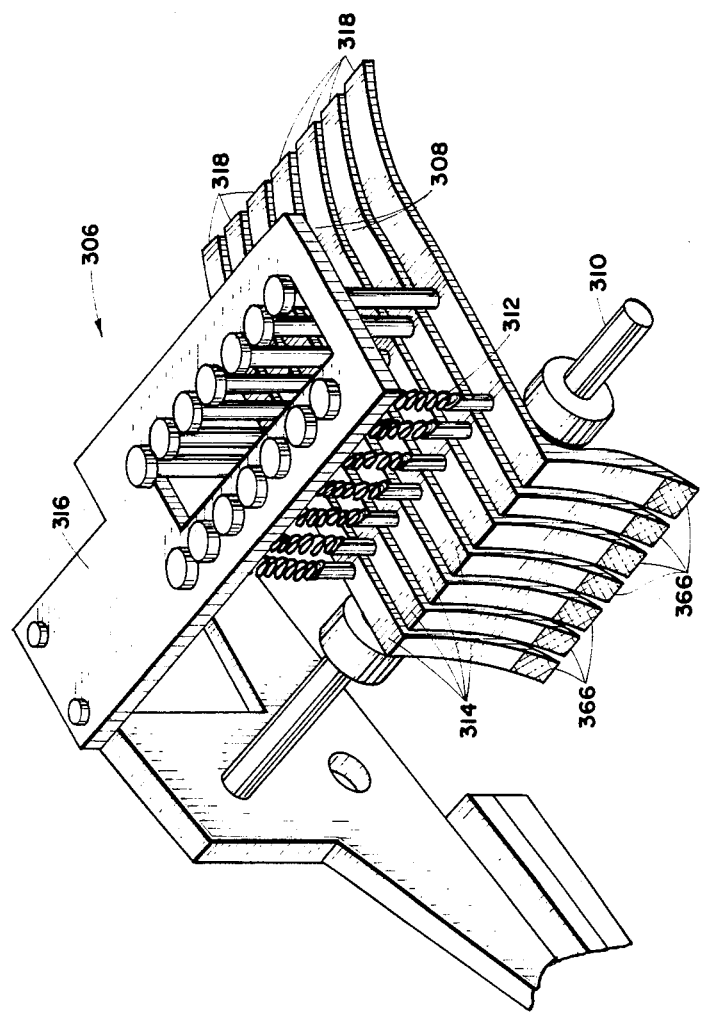
FIG. 29 is a perspective view of a portion of the embodiment of FIG. 28, showing the cigarette-metering fingers.
Figure 30:
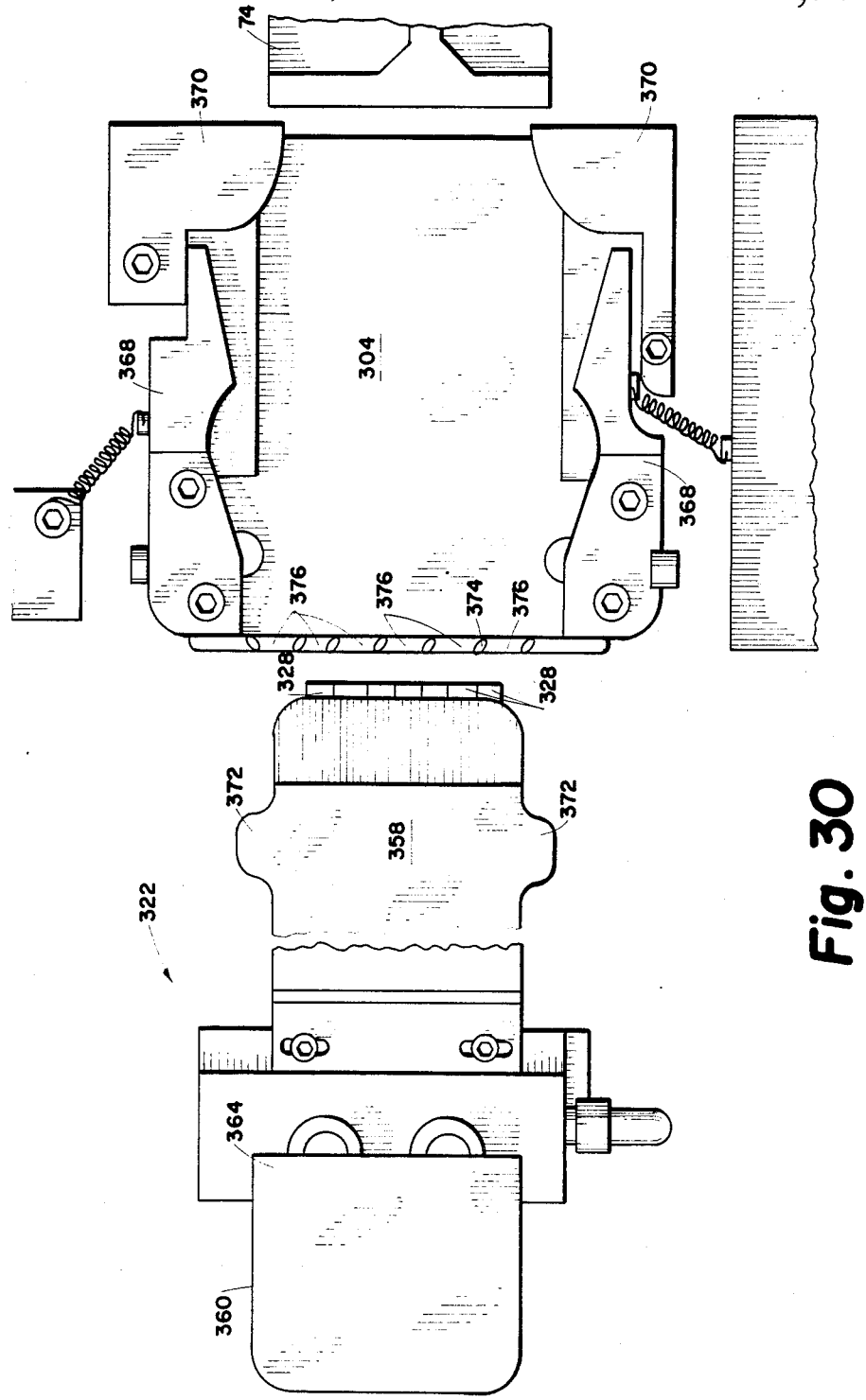
FIG. 30 is a top view of the embodiment of FIG. 28, showing the relation of the receiving bed and of the pusher element.
Figure 31:
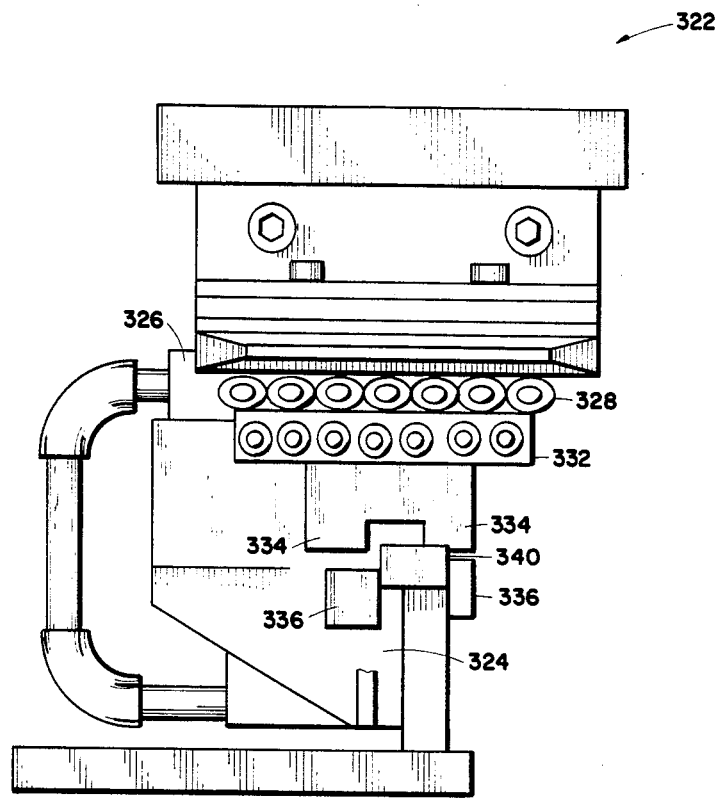
FIG. 31 is an end view of the pusher element of the embodiment of FIG. 28.
Figure 32:
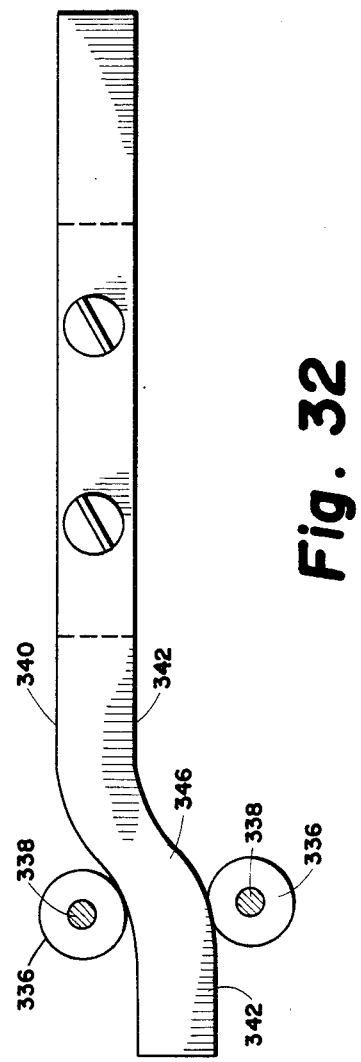
FIG. 32 is a top view of the pusher assembly bar cam of the embodiment of FIG. 28.

FIGS. 25-27 show a third embodiment 220. As shown in FIG. 26, the pathways defined by the vanes are of such a width at the top, and are so shaped, as to direct each cigarette directly to a trough 222 in the receiving bed 224 with the major axis of the cigarette cross-section substantially horizontal. The troughs 222 in the upper surface of the receiving bed 224 are adapted to receive the cigarettes in approximately the horizontal orientation. When the cigarettes are dropped onto the receiving tray 224, the troughs 222 are relatively far apart (as shown in FIG. 24), being directly beneath the outlets of the pathways 226. The troughs 222 are adapted to be moved closer together to move the cigarettes to the correct spacing and angular orientation for packing.

As can be seen, the receiving bed 224 comprises a number of bar-like members 228, 230, 232, 234 equal in number to the pathways 226. Each has a trough 222 defined in its upper surface. The outermost elements 228 each have a horizontal plate 236 secured thereto or integral therewith, with a front-to-back groove 238 on the undersurface to locate the bed 224 properly on the packing machine.

Each of the elements 228, 230, 232, 234 has a number of apertures in its side surfaces. Three through-apertures 240 in each receive respective cylindrical shafts 242, which are parallel and stationary and serve as a rack on which the trough elements 228, 230, 232, 234 are free to slide. Each of the end trough elements 228 has two additional bores, each of which receives the shaft end of a bolt 244. Each of the other trough elements except the middle one 234 has four apertures for receiving bolts, as described below. The elements 230 each have two bores receiving the heads of bolts 244 with countersunk bores receiving the bolt shaft. The bolts 244 received therein have their shaft ends secured in the apertures in the end pieces 228. The trough elements 230 are free to slide along the bolts 244, which thus act as guide elements and stops.

The elements 232 each have four such wide bores with countersunk narrow bores, receiving bolts 246 connected to elements 230 and bolts 248 connected to the central element 234.

The structure described permits the seven trough elements to be moved between two positions: an extended position, shown in FIGS. 25 and 26, in which each trough element is spaced as far from its neighbors as permitted by the bolts, and a packing position (not shown), in which each trough element abuts its neighbors. A detaining member (not shown) can be used to engage the second-from-bottom layer of cigarettes and to hold them up to prevent their weight from hindering the bed movement and the packing.

In operation, the cigarettes which drop between the vanes fall on the bed 224 when the latter is in the extended position. Periodically, suitable control means, within the ability of those skilled in the art to construct, moves the outermost trough elements 228 together to bring the receiving bed 224 into the packing configuration. This movement, besides bringing the cigarettes to the proper spacing for packing, will also correct any error in their angular orientation. The pusher element is activated in the same manner as in the preceding embodiments to load the cigarettes into the pocket, after which the receiving bed 224 is returned to the extended configuration.

To prevent the cigarettes above the receiving bed 24 from dropping onto the bed 224 while the latter is in the packing position, a retaining device such as that described below should be used.

FIGS. 28-33 show another preferred embodiment. In the embodiment of FIGS. 28-33, cigarettes are separated into several generally parallel paths by a hopper (indicated in phantom in FIG. 28 at 302), resembling that shown in part in FIG. 26. The cigarettes fall through the hopper 302 in the horizontal orientation, as defined above, onto a flat receiving bed 304.

In front of the hopper 302 is a metering finger assembly (indicated in phantom at 306 in FIG. 28 and shown in full in FIG. 29), which includes a set of fingers 308 equal in number to the cigarette paths of the hopper 302. Each finger 308 is mounted to be pivotable about a horizontal axis 310. Springs 312 mounted between the upper part 314 of each finger 308 and a horizontal bar 316 thereabove resiliently urge the lower part 318 of each finger 308 toward the hopper 302. Each finger 308 is located in front of a respective pathway of the hopper 302, and is positioned so that the lower end 318 of the finger 308 will engage one end of a cigarette C located in the pathway and a certain distance above the receiving bed 304. A horizontal bar 320 (indicated in phantom in FIG. 30) is located beneath the lower ends 318 of the fingers 308, for a purpose described below.

In front of and below the finger assembly 306 is a pusher assembly 322. The pusher assembly 322 includes stationary lower block 324 slidably supporting an upper block 326, on the back surface of which are mounted horizontal hollow pusher rods 328 equal in number to the fingers 308 (seven in the version shown) and extending back toward the receiving bed 304. Each pusher rod 328 is mounted on the back surface of block 326 so as to be rotatable about its own longitudinal axis. The pusher rods 328 are hollow and have the same cross sectional size and shape as the cigarettes with which the machine is to be used. The second pusher rod 328 from each side of the pusher assembly 322 is slightly shorter than those at the outside, and the third pusher rod 328 in from each side is still shorter. These differences in length are very small, e.g., 1/32 inch for each increment.

The end of each pusher rod 328 adjacent block 326, is provided with a downward extending leg 330 for a purpose described below. The lower end of each leg 330 is pivotally connected to a horizontal bar 332 from the lower portion of which depend two additional legs 334. A cylindrical cam follower 336 rotatable about a vertical shaft 338 is disposed on the bottom surface of each of the two legs 334 of the horizontal bar 332. The two cam followers 336 ride on opposite sides of a bar cam 340, described below.

The pusher assembly 322 is movable forward and backward, i.e., toward and away from the finger assembly 306 and the hopper 302. The bar cam 340 (see FIGS. 28, 31 and 32) consists of three straight portions connected by smooth bends: two parallel portions 342, 344 which extend from the pusher assembly 322 toward the back of the machine, and a horizontal, oblique intermediate section 346 connecting them. When the pusher assembly 322 moves toward the hopper 302, the bar cam 340, via the cam followers 336, rotates the pusher rods 328 about their longitudinal axes, for a purpose described below.

Figure 33A:
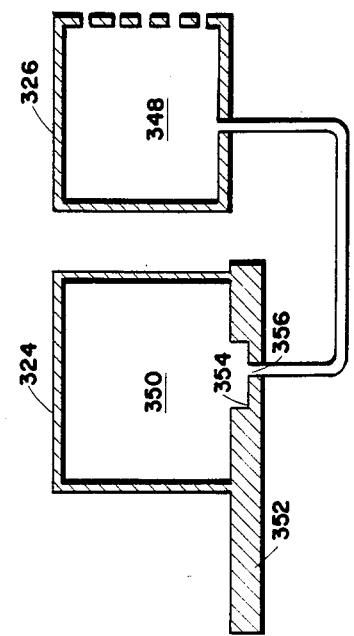
FIG. 33A is a schematic sectional view of the pusher assembly of FIG. 28, illustrating the arrangement and manner of operation of the vacuum system thereof.
Figure 33:
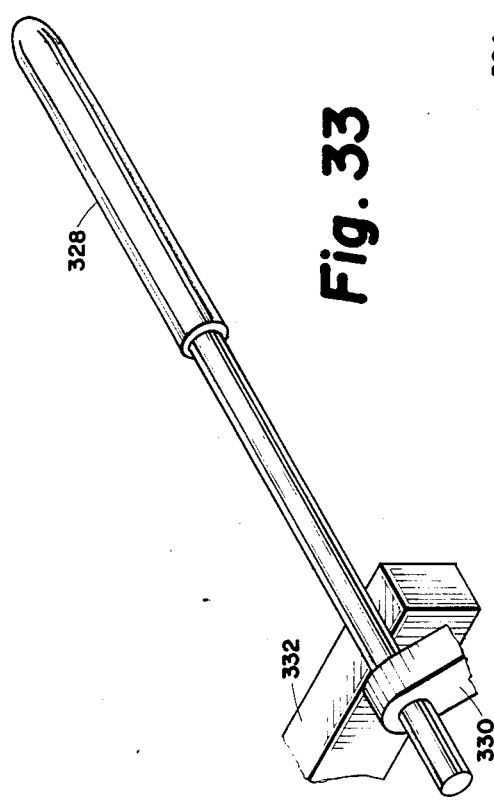
FIG. 33 shows a detail of the pusher assembly of the embodiment of FIG. 28.

Vacuum suction is applied to a cigarette in contact with the free (back) end of the hollow pusher rods 328 via a chamber 348 in the pusher assembly block 326. The vacuum is applied to a chamber 350 (see FIG. 33A) in the interior of stationary lower support block 324, one side of which chamber 350 is defined by a slidable panel 352 having a cut-away portion 354 on the after part of its inner surface and a through aperture 356 communicating with the cut-away portion 354. The sliding panel 352 is mechanically connected to the pusher assembly 322 and moves forward and backward in tandem with the letter. When the pusher assembly 322 is moved toward the back of the machine, vacuum suction is applied to any object in contact with the back (free) end of the pusher rods 328 as long as the aperture 356 is in communication with the interior of the vacuum chamber 350 via the cut-away portion 354 of the sliding panel 352. Once the sliding panel 352 and the pusher assembly 322 have moved back sufficiently so that the cut-away portion 354 no longer communicates with the lower vacuum chamber 350, vacuum suction to the cigarette is cut off.

A lifting element or pre-load plate 358 is mounted on the upper block 326 above and parallel to the pusher rods 328. A meter release cam 360 is mounted on top of the pusher assembly block 326 on a vertical post 362. The meter release cam 360 is a horizontal plate the back edge portion 364 of which is inclined downward. The meter release cam 360 cooperates in a manner described below with a downwardly extending element 366 at the front of each finger 308 of the finger assembly 306.

Two pairs of tuckers 368, 370 are provided adjacent the receiving bed 304 for laterally compressing a row of cigarettes being loaded into a pocket (not shown, but the same as in other embodiments). The front tuckers 368 are spring biased toward each other, and are adapted to be moved apart as described below by horizontally extending cam projections 372 on the sides of the pre-load plate 358. The rear tuckers 370 are mounted behind the first for movement toward and away from each other under control of a suitable mechanism which moves them with the timing described below.

The front edge of the receiving bed 304 has a raised lip 374 in which are seven oval-arcurate depressions 376, each aligned with a respective pusher rod 328.

In operation, cigarettes are loaded into the hopper 302 from a tray and fall toward the receiving bed 304. The metering fingers 308 engage the third layer of cigarettes from the bottom, pressing them axially against the back wall of the hopper 302 and retaining them in position.

To pack the bottom layer of cigarettes into the pocket, the pusher assembly 322 is moved backward, with vacuum suction applied through the pusher rods 328. The pusher rods 328 encounter the ends of the bottom row of cigarettes, lying in the horizontal orientation on the receiving bed 304. The vacuum suction holds the cigarettes against the ends of the pusher rods 328. The cooperation of the cam followers 336 with the bar cam 340 as the pusher assembly 322 moves backward rotates the pusher rods 328 via the legs 330. This moves the cigarettes into the correct angular orientation for packing.

Continued backward motion of the pusher assembly 322 causes the meter release cam 360 to engage the depending front portions 366 of the metering fingers 308, pushing the latter out of engagement with the stack of cigarettes. At this point, the pre-load beneath plate has been inserted beneath the second layer of cigarettes, supporting them and preventing their weight from interfering with the rearward movement of the cigarettes being packed. The cigarettes, released by the fingers 308, drop onto the layer resting on the pre-load plate 358.

The continued motion of the pusher assembly 322 also causes the horizontal cam projections 372 on the preload plate 358 to push the front tuckers 368 toward each other, forcing the cigarettes being sacked closer together. The tucker springs then move the tuckers 368 apart and out of the way of the pusher assembly 322.

The length of the cut-away portion 354 on the interior of the sliding panel 352 on the lower vacuum chamber 350 is such that the vacuum suction applied to the cigarettes is terminated when the cigarettes have been attained the proper orientation and spacing.

As the cigarettes continue to be pushed back toward the pocket, the rear tuckers 370 move together, ensuring that the cigarettes remain sufficiently close together to enter the pocket. The horizontal bar 320 over the front end of the receiving bed 304 keeps the cigarettes in a single layer as they are pushed together by the tuckers 368, 370.

After the cigarettes have been placed in the pocket, the pusher assembly 322 is retracted toward the front of the machine. Since the fingers 308 are held away from the hopper 302 by the meter release cam 360, the cigarettes in the hopper 302 all drop by one layer as the preload plate 358 moves out of the way. When the meter release cam 360 no longer engages the finger assembly 306, the spring biasing of the latter causes the lower ends 318 of the fingers 308 to engage the stack of cigarettes, completing the cycle.

Figure 34:
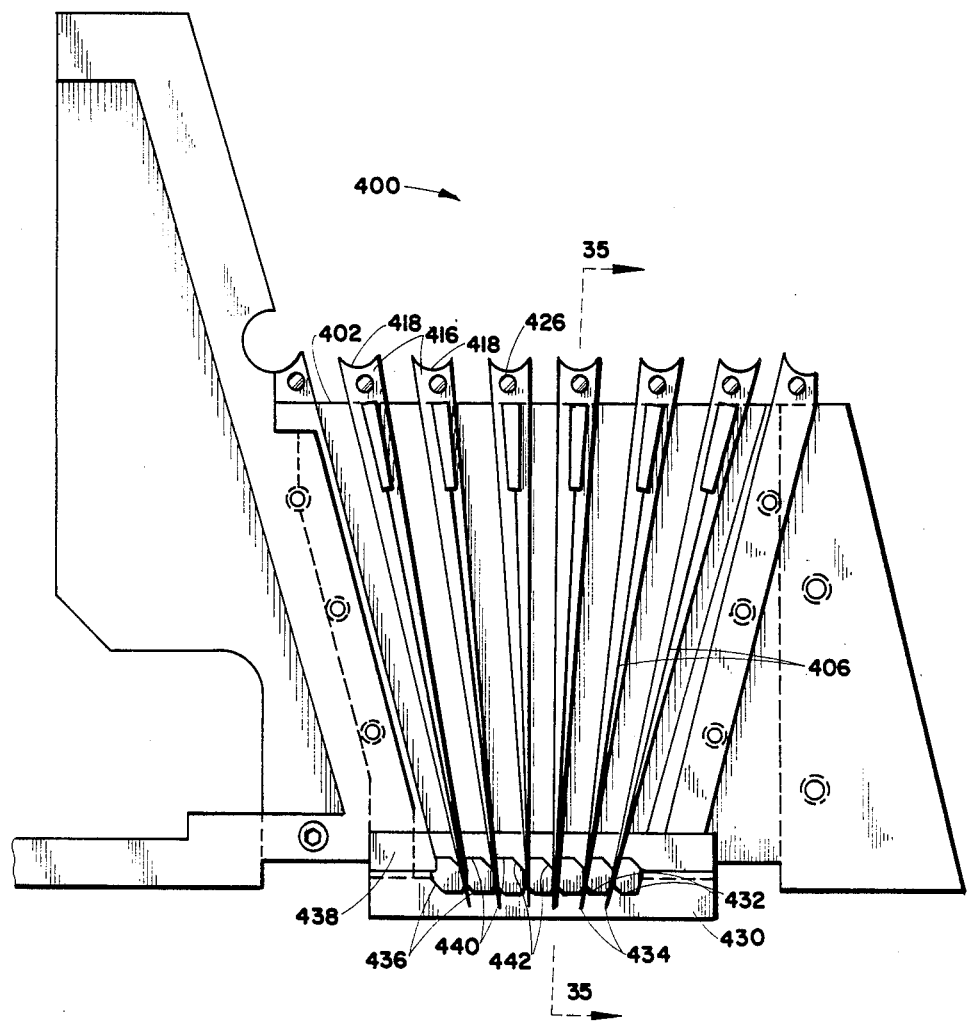
FIGS. 34 and 35 illustrate another embodiment of the vane structure preferably used to practice the invention, FIG. 35 being a view taken from section line 35—35 in FIG. 34.
Figure 35:
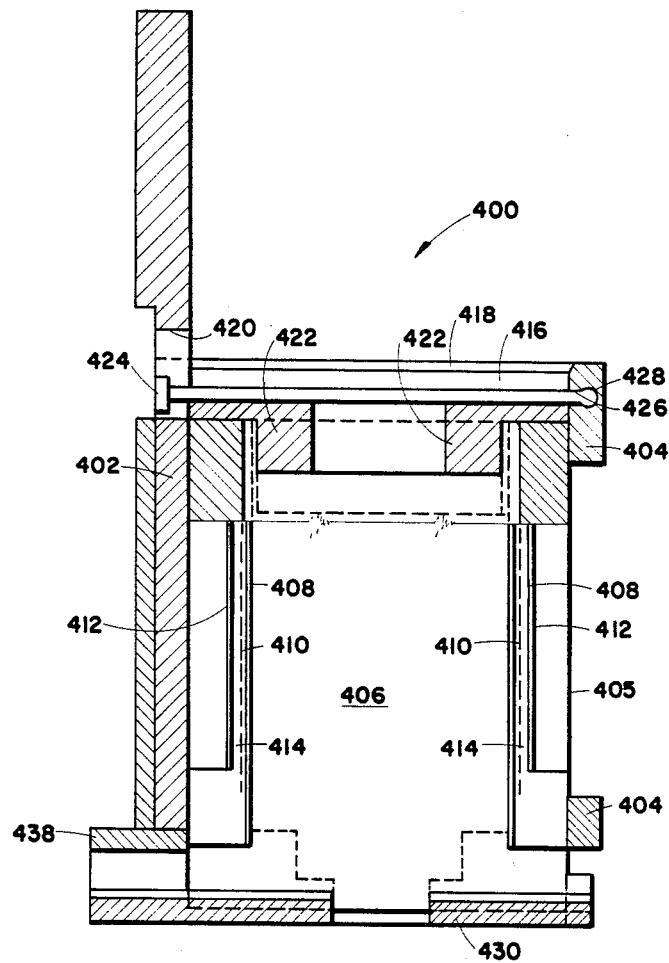

FIGS. 34 and 35 show another preferred embodiment of the hopper 400 used in the invention. As in the embodiments described above, the hopper 400 (only one end of which is shown in FIG. 34) is defined between front and back planes. The back plane is defined by a plate 402. In the embodiment shown, the front plane is defined by horizontal bars 404 that to provide the necessary structural support for the hopper 400, and by a plate 405 (omitted from FIG. 34 for clarity) supported by bars 404.

As shown most clearly in FIG. 35, the hopper 400 comprises vanes 406 made of sheets of spring steel. V-shaped vane mounting elements 408 are provided at the front and back of the space between the front and back planes and are provided with grooves 410 receiving the edges of the spring steel sheets 406. To minimize friction, the side surfaces of the vane mounting elements 408 are recessed (at 412). The cigarettes fall between the vanes 406, contacting only the raised surfaces 414 of the vane mounting elements 408.

At the top of each vane 406 is a top piece 416 whose upper surface 418 is concave and above which is disposed a rotating guide roller (not shown) like those of the embodiment of FIG. 3. A hole 420 is provided in the back plate 402 for mounting the guide roller for rotation.

The top piece 416 has a middle portion 422 extending along approximately half of the length of the top piece 416 and extending down into the space between the front and back vane mounting elements 408. The ends of the top pieces 416 are supported on the tops of the vane mounting elements 408 at the front and back of the hopper 400. A screw 424 secures one end of the top piece 416 to the back plate 402 of the hopper 400.

The central part 422 of the top piece 416 is hollow, and communicates both with the hopper interior and with a longitudinal bore 426 provided just beneath the upper surface 418 of the top piece 416. The horizontal bar 404 mounted at the top of the front of the hopper 400 has a longitudinal bore 428. Bore 428 communicates with the bores 426 of the top pieces 416 and is used to supply air which is blown down along both sides of each sheet 406 of spring steel into the hopper interior. The blowing air facilitates the quick movement of the cigarettes through the hopper 400, and reduces the likelihood of jamming.

The bottom of the hopper 400 is defined by a receiving bed 430, which as in the embodiment of FIG. 3 is a tray-like element having a plurality of troughs 432 defined in its upper surface, one trough 432 for each cigarette path in the hopper 400. In the embodiment shown, the central part of the bottom of each sheet of spring steel 406 is received in a groove 434 at one side of a respective trough 432. One side 436 of each trough 432 is inclined so that a cigarette received therein will lie at an angle. The inclined surfaces 436 of the troughs 432 are defined by ridges abutting the adjacent sheets of spring steel 406, so that the sheet 406 defines one side of the next trough 432. As in the embodiment of FIG. 3, vacuum suction can be applied to an article in the trough 432 via an aperture (not shown) at the bottom of the trough 432.

At the back of the receiving bed 430 is a cover 438 like that of the embodiment of FIG. 3, having troughs 440 formed in its undersurface. The troughs 440 of the cover 438 overlie respective troughs 432 of the receiving bed 430 and define therewith tubes to aid in guiding the cigarettes into a pocket located behind the hopper 400. The troughs 440 in the cover 438 are preferably formed with a bevel 442 at one side like those of the receiving bed troughs 432. The bevels 442 in the cover troughs 440, however, are located at the opposite side of the troughs 440 from the lower bevels 436 and preferably occupy a larger fraction of the width of the cover troughs 440 than do the lower trough bevels 436.

In the embodiment of FIGS. 34 and 35, cigarettes are guided into the hopper 400 by the guide rollers in the same manner as in the embodiment of FIG. 3. The cigarettes, aided by the blown air, fall in the vertical orientation and land on the receiving bed 430. The shape of the troughs 432 orients the cigarettes for packing. Beyond this, the operation of this embodiment is like that of the embodiment of FIG. 3 and therefore will not be described further.

Although the present invention has been described in detail with reference to several preferred embodiments, many variations and modifications thereof will now be apparent to those skilled in the art. Accordingly, the scope of the invention is to be limited, not by the details of the embodiments illustratively described herein, but only by the terms of the appended claims.

We claim:

1. An apparatus for packing rod-shaped articles of oval cross section, said apparatus comprising:
    separating means for separating the articles into a plurality of separate streams in respective paths, said separating means comprising a plurality of vanes for separating the articles into said streams, each of said vanes having first and second ribs disposed at first and second spaced-apart lateral positions on one side thereof and a third rib disposed on the other side thereof at a third lateral position intermediate said first and second spaced-apart lateral positions to aid in guiding the articles between said vanes;
    receiving bed means for receiving the articles from said separating means with a first angular orientation, said receiving bed means comprising a plurality of troughs having inclined planar side surfaces for receiving such articles in said first angular orientation, said troughs being equal in number to said streams; and
    means for pushing a group of the articles from said receiving means, with each article of the group in a predetermined packing orientation, into a container located at a packing position.

2. The apparatus of claim 1, wherein said receiving bed means includes groove means adjacent the respective troughs, each of said vanes having a lower portion retained in such groove and defining an inclined side of said trough.

3. An apparatus for packing oval-shaped smoking articles of oval cross section, said apparatus comprising:
    separating means for separating the articles into a plurality of separate streams in respective paths;
    receiving bed means for receiving the articles from said separating means with a first angular orientation, said receiving bed means comprising a plurality of troughs for receiving articles in said first orientation, said troughs being equal in number to said streams and being spaced apart in an extended position for receiving said articles, each of said troughs receiving one of the articles at a time, and further comprising means for moving said troughs together from said extended position to achieve a predetermined packing orientation; and
    means for pushing a group of the articles from said receiving bed means, with each article of the group in said predetermined packing orientation, into a container located at a packing position.

4. The apparatus of claim 3 wherein said receiving bed means comprises bars having upper surfaces each having one said trough formed therein, said bars being mounted for movement toward and away from each other between said extended position and a position in which said troughs are moved together.

* * * * *